(Model.)

F. L. ALBURY.
FISH TRAP.

No. 605,834. Patented June 21, 1898.

WITNESSES
A. B. Diggis
A. F. Stearns

INVENTOR
Frederick L. Albury
pr. N. W. Stearns,
Attorney.

UNITED STATES PATENT OFFICE.

FREDERICK L. ALBURY, OF TAMPA, FLORIDA, ASSIGNOR OF ONE-HALF TO ERNEST H. HESTER AND CALVIN B. BARNARD, OF SAME PLACE.

FISH-TRAP.

SPECIFICATION forming part of Letters Patent No. 605,834, dated June 21, 1898.

Application filed April 22, 1897. Serial No. 633,412. (Model.)

*To all whom it may concern:*

Be it known that I, FREDERICK L. ALBURY, of Tampa, Hillsborough county, Florida, have invented certain Improvements in Fish-Traps, of which the following is a full, clear, and exact description, reference being had to the accompanying drawings, making part of this specification, in which—

Figure 1:
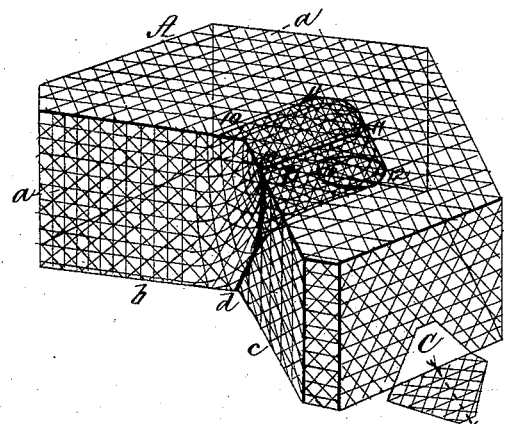
Figure 2:
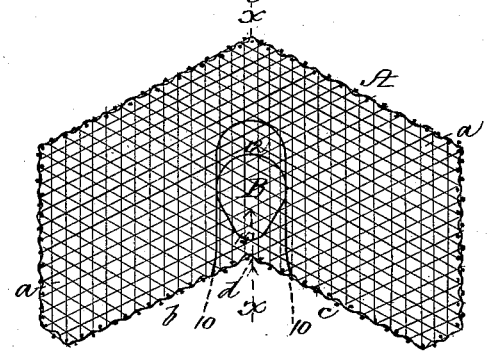
Figure 3:
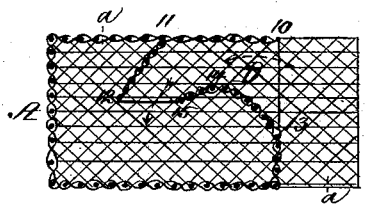
Figure 4:
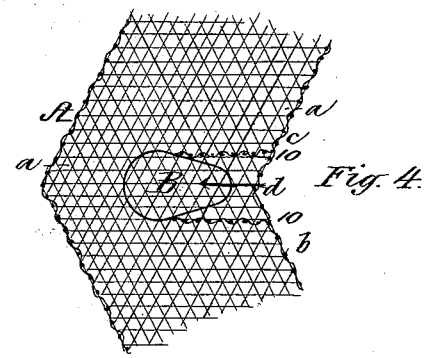
Figure 6:
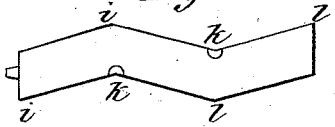
Figure 8:
Figure 7:
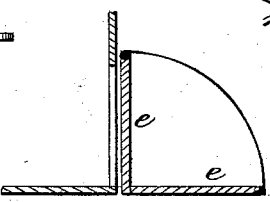
Figure 5:
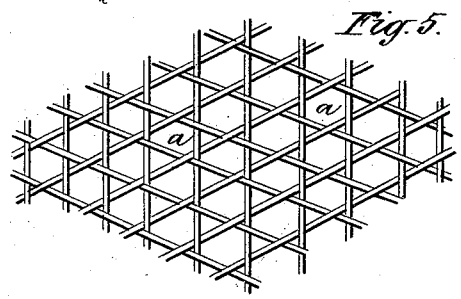

Figure 1 is a perspective view of a fish-trap constructed in accordance with my invention. Fig. 2 is a plan of the same; Fig. 3, a vertical section on the line $xx$ of Fig. 2; Fig. 4, a horizontal section. Fig. 5 represents one pattern of woven mesh; Fig. 6, the form of my double trap on a reduced scale; Fig. 7, a door of the outlet open and closed; Fig. 8, a sliding instead of a swinging door.

This invention consists in an open-work (either woven or perforated) fish-trap having an inlet of peculiar form for the entrance of the fish, in combination with an outlet by which the fish may be readily removed, the construction and arrangement of the several parts being hereinafter specifically described and claimed.

In Figs. 1 to 4, inclusive, of said drawings, A represents one form of my improved fish-trap constructed of woven material—for instance, of wire, cane, ratan, &c.—with meshes $a$ of sufficient size to prevent the escape through them of the fish desired to be taken. Two of the sides of the trap $b\ c$ are inclined inward to a point $d$, as shown in Figs. 1, 2, and 4, forming a reëntrant angle at their junction, at which point I locate the inlet B for the fish to enter, being attracted to the inside of the trap, where any suitable bait is placed. The top of the upper outer end 10 of this inlet is immediately under the top of the trap, from which it extends inwardly in about a horizontal direction to a point 11, and thence continues inward and downward to the point 12 to form the upper side of the inlet-passage, the bottom of said passage extending from the outer lower end 13 to a point 14 and tapering from thence downward to the point 15, the inner lower end of this passage approximating to an oval in form, Figs. 2 and 4, and located inside of the trap, Fig. 3. The outlet C, by which the fish are removed, is controlled by a swinging door $e$, as shown in Fig. 7, or by a slide $h$, Fig. 8.

The trap seen in Fig. 6 has two reëntrant angles $i\ k\ l$ and two inlet-openings $k$, located on opposite sides of the trap.

I claim—

A reticulated fish-trap having an inlet located at the reëntrant angle $i\ k\ l$ formed by the junction of two of its sides, the outer end or entrance of said inlet being at or near the top of the trap and the inner end of said inlet being within the trap not far from its bottom, in combination with an outlet by which the fish may be removed, substantially as described.

Witness my hand this 23d day of November, 1897.

FREDERICK L. ALBURY.

In presence of—
 Z. P. FREEMAN,
 C. B. BARNARD.